United States Patent
Kozma

[11] Patent Number: 6,020,013
[45] Date of Patent: Feb. 1, 2000

[54] METHOD OF PREVENTING FREEZER BURN ON FOOD IN STORAGE BAGS

[76] Inventor: Saul A. Kozma, P.O. Box 1711, Dunn, N.C. 28335

[21] Appl. No.: 09/259,923

[22] Filed: Mar. 1, 1999

[51] Int. Cl.⁷ .................................................. B65D 33/16
[52] U.S. Cl. ............................ 426/393; 426/524; 383/61; 62/371; 62/530
[58] Field of Search ..................... 426/393, 524, 426/106, 112, 418, 404, 410; 383/61, 38, 63, 65; 53/474, 133.4, 139.2; 206/484, 219, 221, 541, 548, 549; 62/371, 529, 530

[56] References Cited

U.S. PATENT DOCUMENTS

| | | | |
|---|---|---|---|
| 2,800,269 | 7/1957 | Smith | 229/62.5 |
| 3,565,147 | 2/1971 | Ausnit | 150/3 |
| 4,212,337 | 7/1980 | Kamp | 150/3 |
| 4,548,852 | 10/1985 | Mitchell | 426/111 |
| 4,637,061 | 1/1987 | Riese | 383/38 |
| 5,238,306 | 8/1993 | Heintz | 33/34 |
| 5,380,093 | 1/1995 | Goldman | 383/38 |
| 5,403,094 | 4/1995 | Tomic | 383/63 |
| 5,486,051 | 1/1996 | May | 383/200 |
| 5,525,363 | 6/1996 | Herber et al. | 426/130 |
| 5,839,582 | 11/1998 | Strong | 206/524.8 |

*Primary Examiner*—David Lacey
*Assistant Examiner*—Sherry A. Dauerman
*Attorney, Agent, or Firm*—Mills Law Firm PLLC

[57] ABSTRACT

This invention is a method of preventing freezer burn on frozen foods over an extended period of time. This is accomplished by providing a triple seal to prevent the ingress of ambient air through the seals into the interior of the storage bag which causes freezer burn. This is accomplished by providing an outer liquid impervious interlocking reclosable seal and a second liquid impervious interlocking reclosable inner seal adjacent and parallel to the outer seal. When food is placed in the storage bag, the inner seal is closed, water is put in the mouth of the storage bag above the sealed inner seal and below the open outer seal. The outer seal is then closed forming a triple seal closure that completely eliminates any possibility of ambient air entering into the interior of the storage bag.

3 Claims, 2 Drawing Sheets

METHOD OF PREVENTING FREEZER BURN ON FOOD IN STORAGE BAGS

BACKGROUND OF INVENTION

1. Field of Invention

The storage of food in resealable plastic bags has come in to wide use. These bags are usually rectangular in shape with an open edge that is sealable with interlocking male and female tracks or zippers. These seals are of the type that are not necessarily airtight. Also, when the sealed storage bags are frozen, the closures are less resilient and the seals can be broken while rearranging adjacent frozen foods.

Although most resealable storage bags on the market today are waterproof when sealed and appear to be airtight, when stored for extended periods of time, air does penetrate the seal creating frost which causes freezer burn. Up to the present time there has been no way to prevent freezer burn of food placed in plastic resealable storage containers for extended period of time.

The problem is amplified when frost free freezer compartments are used since the periodic warming cycles to melt frost and then refreezes allowing additional frost to accumulate within the storage bag.

2. Concise Explanation of Prior Art

U.S. Pat. No. 2,800,269 to Donald P. Smith, assigned to Millprint, Inc. of Milwaukee, Wis. discloses a flexible pouch or bag that is valved for measuring the amount of liquid to be added to a premixed dry ingredient.

U.S. Pat. No. 3,565,147 to Steven Ausnit is considered of interest in that it discloses a plastic bag having cooperating male and female pressure fastenable, releasable, interlocking elements for selectively closing the open end of the bag and a pair of stiffener ribs to provide increased lateral rigidity.

U.S. Pat. No. 4,212,337 to Ewald A. Kamp, assigned to Union Carbide Corporation of New York, N.Y. discloses a closure fastening means that allows a plastic type bag to be opened and closed repeatedly.

U.S. Pat. No. 4,637,061 to J. Richard Riese discloses a specimen, sample collection and transport container with dual parallel seals in the lower portion of the container and adjacent the mouth thereof.

U.S. Pat. No. 5,238,306 to David A. Heintz and Steven H. Simonsen, assigned to Reynolds Consumer Products, Inc. of Appleton, Wis. discloses a method of producing a sealing system for reclosable webbed-wall package.

U.S. Pat. No. 5,380,093 to Robert I. Goldman discloses a vegetable draining storage bag with a perforated bottom so that once the excess water has drained from the vegetables, it can be poured out from a channel that extends from the bottom of the bag to the top opening.

U.S. Pat. No. 5,403,094 to Misdomir Tomic, assigned to Reynolds Consumer Products, Inc. of Appleton Wis. discloses a storage bag with a reclosable zipper with a plurality of notches which enhance the ease of locking the zipper and provides positive tactile feedback indicative of effective locking of the zipper.

U.S. Pat. No. 5,486,051 to Timothy J. May, assigned to Reynolds Consumer Products, Inc. of Appleton, Wis. discloses a closure arrangement for a package container with sealing zipper and a breakaway strip to form a seal.

Finally, U.S. Pat. No. 5,839,582 to William P. Strong and Robert P. Mueller discloses a self-vacuum storage bag with an interlocking reusable seal adjacent the open edge of the bag with a second interlocking seal extending only partially across the bag and having a permanent opening at the end thereof.

BRIEF DESCRIPTION OF INVENTION

After much research and study into the above mentioned problems, the present invention has been developed to provide a means and method of preventing the ingress of air into resealable storage bags for frozen foods. The present invention, in addition to providing a complete barrier to the air seepage which causes freezer burn, it also greatly reduces the chance of the seal on the bag being opened when adjacent frozen foods are shuffled or rearranged.

The present invention is a simple and highly efficient air barrier with parallel liquid impervious interlocking reclosable fasteners with water therebetween which, when frozen, form is an air impenetrable hard closure.

To accomplish the above, two parallel interlocking reclosable fasteners are disposed adjacent the normal opening in the storage bag. The inner interlocking fastener is closed or sealed, the water is poured thereabove and the outer interlocking fastener or seal is closed trapping the water between the two closures. When the storage bag is frozen, the water freezes assuring that no air can ingress into the main part of the storage bag even when stored over long periods of time thus preventing freezer burn to the food in the bag or container.

In view of the above, it is an object of the present invention to provide a simple and highly effective means for preventing the ingress of air into reusable plastic storage bags containing frozen foods.

Another object of the present invention is to provide a simple and yet highly efficient means of providing a complete barrier to air seepage which causes freezer burn.

Another object of the present invention is to provide a highly efficient air barrier with parallel liquid leak proof interlocking reclosable fasteners with water disposed therebetween which, when frozen, forms an air impenetrable hard closure.

Another object of the present invention is to provide a pair of parallel interlocking reclosable fasteners which are disposed adjacent the normal opening of a storage bag which, when water is placed between the two fasteners and is frozen, a triple barrier to the ingress of air is provided.

Another object of the present invention is to provide a hard closure for storage bag by freezing ice between two parallel reclosable fasteners adjacent the mouth of the bag.

Other objects and advantages of the present invention will become apparent and obvious from a study of the following description and the accompanying drawings which are merely illustrative of such invention.

DETAILED DESCRIPTION OF INVENTION

Figure 1:
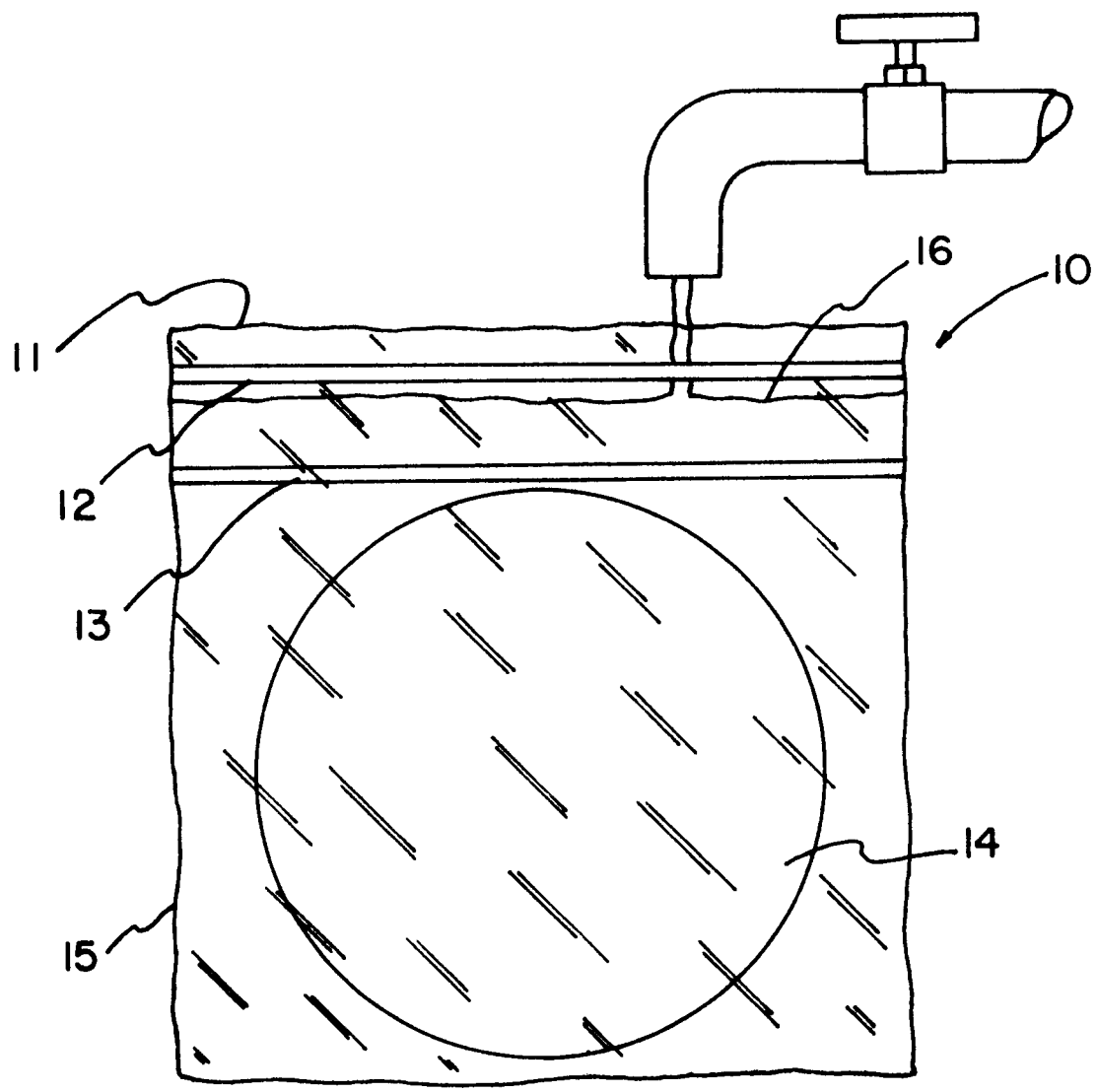
FIG. 1 is a plan view of a plastic storage bag with two parallel interlocking reclosable fasteners adjacent the open mouth of such bag.

The reusable, triple seal plastic storage bag is indicated generally at 10. This storage bag has the normal reclosable seal 12 with mating interlocking tracks. Since mating, interlocking tracks or zippers are well known to those skilled in the art, are commercially available, and are shown in references cited, further detailed discussion of the same is not deemed necessary.

The storage bag 10 of the present invention has an open side or mouth 11 through which products can be passed into and out of such storage bag. A second, inner interlocking reclosable seal 13 is disposed across the storage bag parallel to and in spatial relation with the outer interlocking reclosable seal 12.

Mating, interlocking tracks or zippers are indicated at 13' and 13".

The interlocking reclosable seals 12 and 13 will not leak liquids. On the other hand they do not necessarily prevent air from ingressing, particularly when frozen for extended periods of time.

Figure 2:
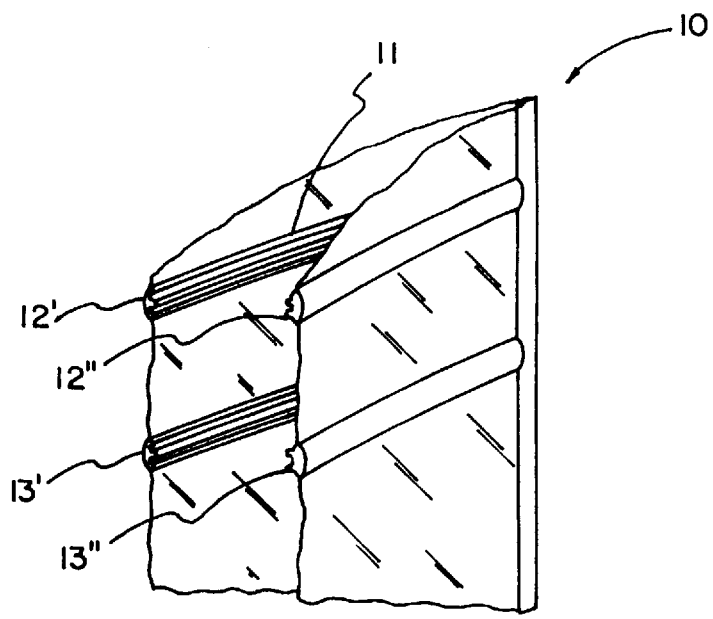
FIG. 2 is an enlarged cut-away perspective view of the mouth of the bag and the two parallel closures.
Figure 3:
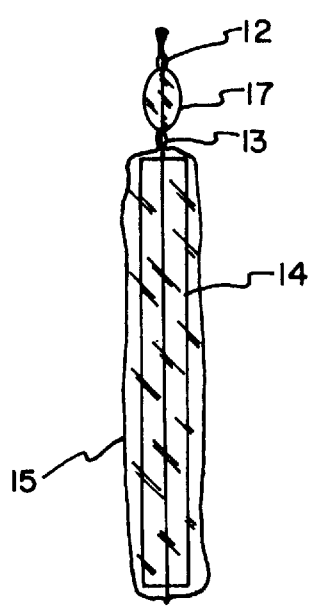
FIG. 3 is a sectional view of frozen food in the storage bag with the triple seals in place.

To use the storage bag 10 of the present invention, the outer and inner interlocking reclosable seals are opened as shown in FIG. 2 and the food product 14 to be stored in the bag is passed therein through the open mouth 11. The body of the bag 15 is pressed juxtaposed to the food 14 to remove as much air as possible and the lower mating, interlocking tracks or zippers of interlocking seal 13 are pressed together to close such seal. Water is then poured between the sealed inner seal 13 and the open outer seal 12. The outer seal 12 is then sealed in the same manner described for the seal 13. We now have the plastic storage bag with inner and outer seals closed and water captured therebetween.

When the two closed seals 12 and 13 with the water 16 therebetween, the storage bag is triple sealed with the assurance that no ambient air can ingress into the body 15 of the bag 10.

The storage bag with its food 14 stored therein can be frozen so that the water 16 becomes ice 17 which continues to prevent the ingress of air into the interior of the bag which could cause freezer burn.

An additional benefit to the ice seal is that it gives rigidity to the seal which, for all practical purposes, eliminates the possibility of the sealed storage bag being accidentally opened when adjacent frozen foods are shuffled or rearranged. After months or even years, the food 14 will remain frost free with no freezer burn.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. The method of completely sealing air out of a plastic storage bag having an interior comprising:

providing a storage bag having a mouth with an outer liquid impervious interlocking reclosable seal adjacent the mouth and an inner liquid impervious interlocking reclosable seal disposed adjacent and generally parallel to the outer seal;

opening the mouth of the storage bag by opening the inner and outer seals;

passing food to be stored through the mouth of the storage bag and into the interior thereof;

closing the inner liquid impervious seal;

placing water in the mouth of the storage bag above the closed inner seal but below the outer seal; and closing the liquid impervious outer seal whereby a triple seal is provided to prevent the ingresion of ambiemt air into the interior of the bag.

2. The method of claim 1 wherein the sides of the storage bag are pressed juxtaposed to the food prior to closing the inner seal.

3. The method of claim 1 wherein the food in the triple seal storage bag is stored in a frozen condition over an extended period of time without the ingress of ambient air which causes freezer burn.

* * * * *